United States Patent
Bhowmik et al.

(10) Patent No.: US 10,965,128 B2
(45) Date of Patent: Mar. 30, 2021

(54) SYSTEMS AND METHODS FOR ADVANCED GRID INTEGRATION OF DISTRIBUTED GENERATORS AND ENERGY RESOURCES

(71) Applicants: SINEWATTS, INC., Charlotte, NC (US); THE UNIVERSITY OF NORTH CAROLINA AT CHARLOTTE, Charlotte, NC (US)

(72) Inventors: Shibashis Bhowmik, Charlotte, NC (US); Hamidreza Jafarian, Charlotte, NC (US); Babak Parkhideh, Charlotte, NC (US); Robert Cox, Charlotte, NC (US)

(73) Assignee: SINEWATTS INC., Charlotte, NC (US)

( * ) Notice: Subject to any disclaimer, the term of this patent is extended or adjusted under 35 U.S.C. 154(b) by 132 days.

(21) Appl. No.: 16/065,781

(22) PCT Filed: Dec. 22, 2016

(86) PCT No.: PCT/US2016/068451
§ 371 (c)(1),
(2) Date: Jun. 22, 2018

(87) PCT Pub. No.: WO2017/112912
PCT Pub. Date: Jun. 29, 2017

(65) Prior Publication Data
US 2018/0375336 A1    Dec. 27, 2018

Related U.S. Application Data

(60) Provisional application No. 62/271,037, filed on Dec. 22, 2015.

(51) Int. Cl.
*H02J 3/38*    (2006.01)
*H02M 7/42*    (2006.01)
(Continued)

(52) U.S. Cl.
CPC ............ *H02J 3/385* (2013.01); *H02J 3/00* (2013.01); *H02J 3/01* (2013.01); *H02J 3/38* (2013.01);
(Continued)

(58) Field of Classification Search
CPC ...... H02J 3/385; H02J 3/00; H02J 3/01; H02J 3/38; H02J 3/40; H02M 1/12; H02M 7/42; H02M 2001/0077
See application file for complete search history.

(56) References Cited

U.S. PATENT DOCUMENTS 9,136,732 B2    9/2015    Wolter
2009/0160259 A1*  6/2009    Naiknaware ........ H02M 7/4807
                                                        307/82

(Continued)

OTHER PUBLICATIONS

IB of WIPO—Notification Concerning Transmittal of International Preliminary Report on Patentability dated Jul. 5, 2018 for International Application No. PCT/US2016/068451 (8 pgs).

(Continued)

*Primary Examiner* — Carlos Amaya
(74) *Attorney, Agent, or Firm* — K&L Gates LLP

(57) ABSTRACT

A circuit for a smart photovoltaic (PV) inverter system and the smart PV inverter system are described. The circuit includes one or more strings coupled to an electrical load. Each of the one or more strings further includes one or more string members coupled in series, where each of the one or more string members comprises a voltage source and an inverter. The circuit also includes a controller to receive an output from an operator controller and control the strings, where the controller is configured to control the strings by providing a function command to a first string member of each of the one or more strings based on the output from the operator controller. The voltage source may also receive an output from an energy output device. Further, the inverter (Continued)

may be configured to convert the output of energy output device into an energy source of electrical load.

18 Claims, 13 Drawing Sheets

(51) Int. Cl.
*H02J 3/40* (2006.01)
*H02J 3/00* (2006.01)
*H02M 1/12* (2006.01)
*H02J 3/01* (2006.01)
*H02M 1/00* (2006.01)

(52) U.S. Cl.
CPC ............... *H02J 3/40* (2013.01); *H02M 1/12* (2013.01); *H02M 7/42* (2013.01); *H02M 2001/0077* (2013.01)

(56) References Cited

U.S. PATENT DOCUMENTS

2013/0176032 A1   7/2013   Zimmanck
2013/0181527 A1*  7/2013   Bhowmik ............... H02M 7/49
                                                          307/63

OTHER PUBLICATIONS

USPTO—Notification of Transmittal of the International Search Report & the Written Opinion of the International Searching Authority, or the Declaration, with the International Search Report & Written Opinion dated Mar. 13, 2017 for International Application No. PCT/US2016/068451 (9 pgs).

Jacques, et al., "New Multilevel Mixed Topology Development to Improve Inverter Robustness for Domestic Photovoltaic Installations." *Journal of Power and Energy Engineering*, vol. 1, No. 5, Oct. 2013, pp. 1-6. Tours, France.

* cited by examiner

SYSTEMS AND METHODS FOR ADVANCED GRID INTEGRATION OF DISTRIBUTED GENERATORS AND ENERGY RESOURCES

CROSS-REFERENCE TO RELATED APPLICATIONS

This patent application is a U.S. National Phase application under 35 U.S.C. § 371 of International Application No. PCT/US2016/068451, filed on Dec. 22, 2016, entitled SYSTEMS AND METHODS FOR ADVANCED GRID INTEGRATION OF DISTRIBUTED GENERATORS AND ENERGY RESOURCES, which claims, under 35 U.S.C. § 119(e), the benefit of priority to U.S. Provisional Patent Application No. 62/271,037, filed on Dec. 22, 2015, the full disclosure of which was incorporated herein by reference.

STATEMENT REGARDING FEDERALLY SPONSORED RESEARCH OR DEVELOPMENT

The embodiments described herein and the work that resulted in those embodiments was funded, in part, by the Office of Energy Efficiency and Renewable Energy (EERE), U.S. Department of Energy, under Award Numbers DE-EE0006459 and DE-EE0006692. The embodiments described herein and the work that resulted in those embodiments is part of activities being performed under the U.S. Department of Energy (DoE), SunShot Incubator Program, Round 9. The U.S. government may have certain rights in the embodiments described herein.

FIELD

Embodiments relate to the field of energy production and distribution systems. More particularly, the embodiments relate to circuits, systems, and methods for an advanced grid integration of distributed generators and energy resources.

BACKGROUND

Available grid codes and standards, such as islanding protection requirements, are designed for a grid connection of photovoltaic (PV) systems of low-penetrated PV networks. An increased penetration of PV systems onto the grid networks, however, may lead to frequent and nuisance tripping of the PV generators. The frequent tripping of the PV generations generators combined with the traditional grid disturbances can trigger local instabilities that cause widespread system disruptions. Accordingly, an efficient and reliable operation of high penetrated PV networks requires ancillary and utility grid assist services from PV inverters.

To meet the demand for "smart" functionalities of PV systems in highly penetrated PV networks, new distributed inverter architectures and control schemes have been proposed. Currently, most of the distributed inverter architectures and control schemes incorporate "smart" functionalities into a wide-range of inverter specifications. The major problems associated with incorporating these "smart" functionalities are their extensive operational requirements and high-bandwidth communication requirements. In addition, the high-bandwidth communication requirements also involve elaborate monitoring systems that are substantially expensive to implement.

SUMMARY

Embodiments described herein relate to circuits, systems, and methods for an advanced grid integration of distributed generators and energy resources. The anticipated impacts (or evolution) of the high penetration of distributed generation and energy resources to the electrical grid has increased manyfold. Some of the major impacts to the electrical grid of the future are the following: (i) two-way power flow due to local and distributed generation; (ii) localized and centralized management and mitigation of intermittent resources (solar, wind, etc.); (iii) real-time balancing of generation and load with fast ramp-up and ramp-down flexible resources; (iv) dynamic (temporal and spatial) voltage and frequency regulation throughout the grid system; and (v) utilization of 2-quadrant or 4-quadrant inverters located at the solar and wind generation facilities for advanced grid stability and support. As such, "smart" functionalities for a distributed PV inverter system are needed to address the anticipated impacts to the electrical grid. As used herein, "smart" functionalities (or "smart" PV inverter functionalities) refer to PV inverter specifications (e.g., voltage support, power factor correction, reactive power injection, etc.).

For one embodiment, a circuit for a smart PV inverter system includes one or more strings coupled to an electrical load. Each of the one or more strings further includes one or more string members that are coupled to each other in series. The string members include, but are not limited to, a voltage source (e.g., a PV panel or battery) and a PV inverter (or a distributed AC inverter) (herein, referred to as an "inverter"). In addition, the circuit for the smart PV inverter system also includes a controller that receives an output from an operator controller and then control the one or more strings, where the controller is configured to control the one or more strings by providing a function command to a first string member of each of the one or more strings based on the output from the operator controller.

For some embodiments, the voltage source of the circuit may also receive an output from an energy output device. For other embodiments, the inverter may be configured to convert the output of the energy output device into an energy source (e.g., alternating current (AC), direct current (DC), etc.) of the electrical load (or as desired by the grid). The circuit may further include the following operations: the first string member of each string calculates a current phase shift based on the function command; the first string member of each string then adjusts a string current of each string based on the calculated current phase shift; and the one or more remaining string members (e.g., VMMs) of each string autonomously modifies their respective output voltage amplitudes based on the adjusted string current.

For some embodiments, the electrical load can include a grid interface to couple the energy collection system to an electrical grid. In addition, the controller may be configured to determine a smart inverter robustness index (SIRI) of each string based on one or more inverter parameters.

Some of the inverter parameters may include, but are not limited to, a conversion efficiency, a total harmonic distortion parameter, a maximum power point tracking effectiveness parameter, and a power factor compliance parameter. In addition, according to some embodiments, each of the string members further includes a distributed controller and a LC filter. For other embodiments, the energy output device may include a PV panel or other energy collection or generation device. Lastly, for one embodiment, the first string member (e.g., CAVC) may include a current comparator while the other remaining string members (e.g., voltage mode molecules (VMMs) have distributed controllers that do not include the current comparator.

As such, according the embodiments described herein, the circuit for the smart PV inverter system may be implemented to facilitate the "smart" functionalities of an advanced grid integration for distributed generators and energy resources, such as highly penetrating integrated inverters. Other advantages and features will become apparent from the accompanying drawings and the following detailed description.

BRIEF DESCRIPTION OF THE DRAWINGS

Embodiments described herein illustrated by way of example and not limitation in the figures of the accompanying drawings, in which like references indicate similar features. Furthermore, some conventional details have been omitted so as not to obscure from the inventive concepts described herein.

FIG. 5A is a graph illustrating an AC voltage transient of a PV inverter string, according to one embodiment. FIG. 5B is a graph illustrating a direct current (DC) voltage control of a maximum power point tracking (MPPT) operation before a power factor (PF) change of a PV inverter string, according to one embodiment. FIG. 5C is a graph illustrating a DC voltage control of a MPPT operation after a PF change of a PV inverter string, according to one embodiment.

DETAILED DESCRIPTION

Described below are systems and methods of a smart PV inverter circuit. Smart PV inverters are described that enable "smart" functionalities for PV systems in highly penetrated PV networks. For one embodiment, a circuit for a smart PV inverter system includes a string coupled to an electrical load, where the string further includes multiple string members (e.g., AC-stacked PV inverters) coupled to each other in series, and a controller that receives an output from an operator controller to control "smart" functionalities of the string.

Embodiments of the smart PV inverter system enable integration requirements of future grid networks by providing maximum power control on each PV inverter. In addition, embodiments of the smart PV inverter system help to deliver smart functionality features and utility-grade reliability by utilizing decentralized control algorithms Embodiments of the smart PV inverter system help to facilitate ancillary service requirements, such as voltage support capability through power factor (PF) control, low-voltage ride-through (LVRT), and reactive power injection (RPI).

Additionally, the smart PV inverter system enhances the performance of PV inverter architectures. Embodiments of the smart PV inverter system helps to facilitate an efficient and reliable operation of high penetrated PV networks by providing a smart inverter robustness index (SIRI) that evaluates the robustness of grid-tied PV inverters. For example, according to some embodiments, SIRI can provide a comparative evaluation of PV inverters using four major operational characteristics, such as conversion efficiency (CE), total harmonic distortion (THD), maximum power point tracking (MPPT) effectiveness, and PF compliance.

Embodiments of the smart PV inverter system thus enable "smart" or advanced inverter functionalities in an advanced grid—without requiring a high bandwidth, a high total cost, or an extensive communications systems. Moreover, embodiments of the smart PV inverter system enable a grid system operator to communicate with a string of AC-stacked inverters, and thereby implement "smart" inverter functionalities in a distributed manner without any primary reliance on communications among the inverters.

Figure 1:
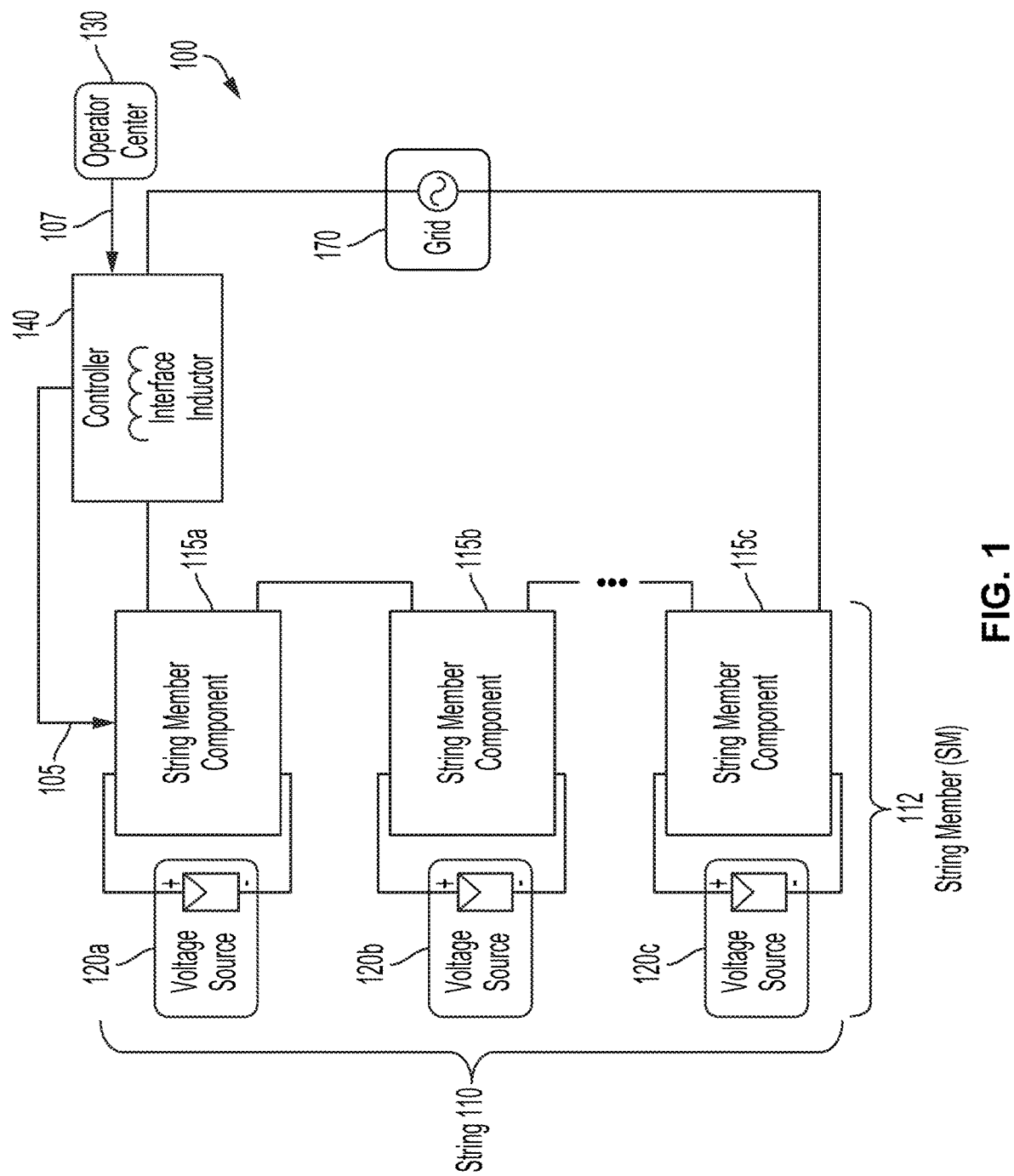
FIG. 1 is a block diagram of a smart PV inverter system, according to one embodiment.

FIG. 1 is a block diagram of a smart PV inverter system 100. Smart PV inverter system 100 may include, but is not limited to, string 110, string members 112, controller 140, operator center 130, and grid 170.

For some embodiments, smart PV inverter system 100 includes one or more strings 110 and operator center 130 (a grid system operator or a central load center). Note that for simplicity purposes, only one string 110 is illustrated in FIG. 1.

The operator center 130 can include an interface to couple to electrical grid 170 or controller 140, or alternatively can include an interface to couple to a stand-alone power system, an AC motor drive, and/or other AC resistive loads. For example, operator center 130 may provide one or more supervisory commands (e.g., PF, voltage, quality (Q) factor measurements, voltage/volt-amp reactance (VAR), etc.) to controller 140. According to some embodiments, the supervisory commands may be communicated or relayed to only one of the string members 112, and the commands may be transmitted as infrequently as a few to tens of minutes depending upon the grid operator requirements. Note that operator center 130 does not require additional system requirements beyond what is implemented for single point of connection inverters. As such, the communication bandwidth and requirements associated with smart PV inverter system 100 are significantly reduced.

For other embodiments, multiple strings 110 can be coupled to the load center 130 depending on various implementations. Each string 110 includes a plurality of string members (SMs) 112 that can be connected to each other in series (e.g., N string members, where N is 1 or greater). For other embodiments, various configurations of SMs 112 can be provided, such as two or more SMs 112 being connected to each other in parallel and/or two or more SMs 112 being connected to each other in both series and parallel. For one embodiment, each SM 112 comprises a string member component 115 and a voltage source 120. For example, SM 112 can include three sting member components 115a-c, where string member component 115c can be the third string member component in series, or alternatively can be a #N string member component in series (i.e., string member component 115c can be the tenth string member component in series when #N is 10).

According to some embodiments, the voltage source 120 for an SM 112 can be photovoltaic (PV) panel(s) for receiving sunlight and generating a DC voltage. For other embodiments, the voltage source 120 can be an energy storage system, such as batteries, flywheels, a fuel cell, or other energy source that is capable of producing DC voltage as an output either directly or indirectly (and if producing AC, with the means of an AC to DC interfacing circuit). For one embodiment, the SM component 115 can be configured to convert an output of an energy output device (e.g., PV panels) into an energy source (e.g., AC, DC, etc.) of the grid 170. For example, smart PV inverter system 100 can include five SMs 112 as part of a string 110 (e.g., N=5) that are connected in series, with each voltage source 120 (e.g., voltage source 120a-c) being a PV panel for generating energy from sunlight. The smart PV inverter system 100 can be used to convert DC energy into AC energy at the PV panel level (e.g., at each SM 112) in a single stage conversion, and sum the voltage that is output from each SM 112 on the string 110 in order to couple to the electrical grid 170.

Figure 2:
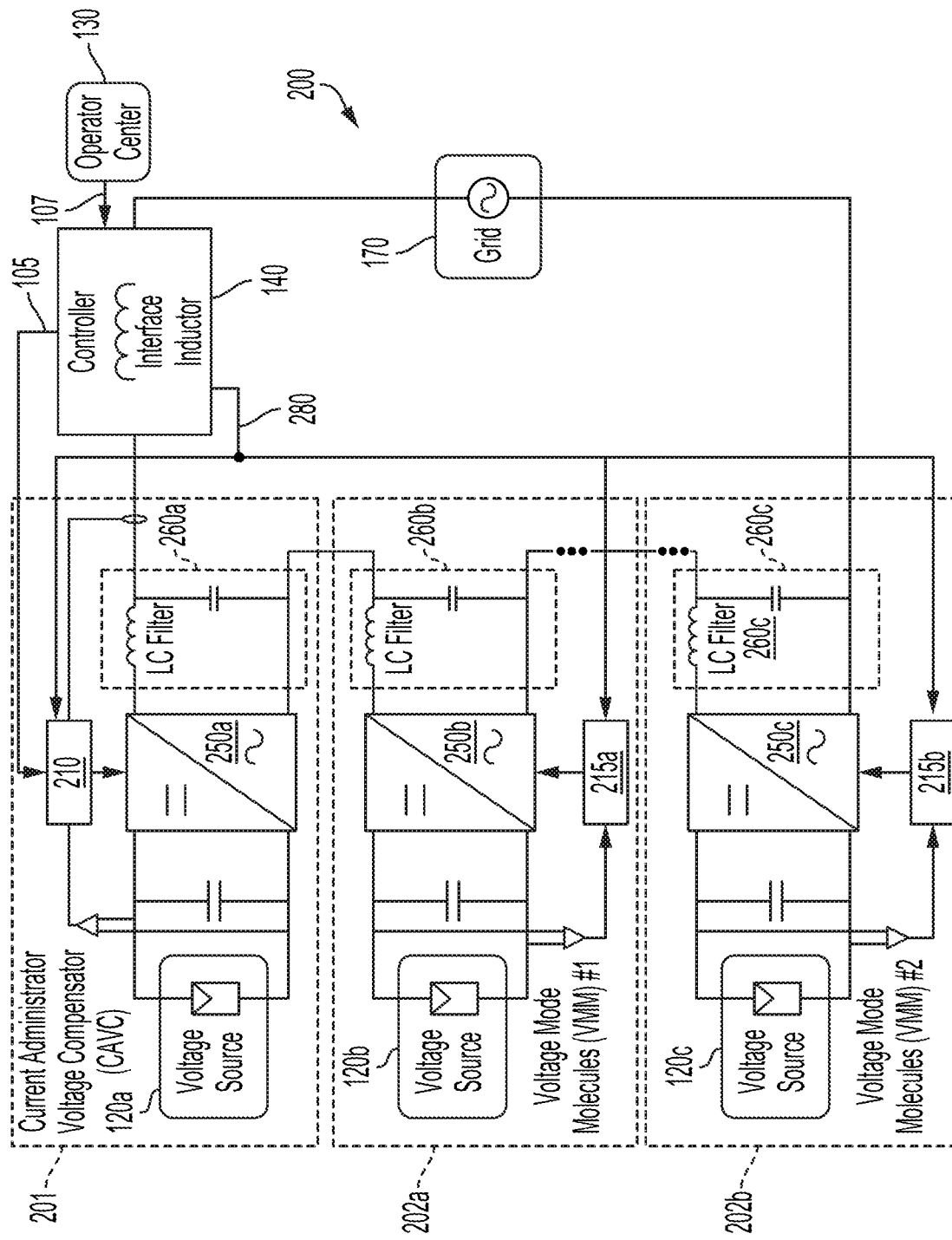
FIG. 2 is a detailed circuit of a smart PV inverter system that includes one or more distributed AC-stacked inverters, according to one embodiment.

For one embodiment, each of the string member components 115a-c includes an inverter or microchip inverter (e.g., PV inverter 250a of FIG. 2), a distributed controller (e.g., distributed controller 210 of FIG. 2), and a LC filter circuit (e.g., LC filter 260a of FIG. 2). For example, string member component 115a may be configured to receive the DC voltage that is generated by voltage source 120a and then convert the DC voltage into AC voltage. Accordingly, for some embodiments, the AC voltage (with its phase) can be outputted by each of the string member components 115a-c, so that the plurality of outputs can be consolidated as a single combined AC output for the respective string 110. For one embodiment, the combined output can be provided to the controller 140 and/or grid 170. Note that string member components 115a-c will be described in further detail below.

According to some embodiments, controller 140 (or termination box) may be coupled between string member component 115a and grid 170. Controller 140 may include an interface inductor and be used to accommodate smart inverter functions. For example, to accommodate for smart inverter functionalities such as voltage support, PF correction, and RPI, controller 140 may transmit the necessary command(s) to only one string member component (e.g., string member component 115a), which is known as the current administrator voltage compensator (CAVC) and discussed in further detail below.

In addition, controller 140 may communicate with string member component 115a (i.e., the CAVC or a first string member) via string current command 105 (or a function command), where only the first string member of each string receives the string current command 105. Note that, as described below in further detail, the CAVC (or the first string member of each string) can be the second, third, fifth, or any #N string member of a string, i.e., the CAVC does not have to be identified or physically located as the first string member.

For one embodiment, the string current command 105 is transmitted by controller 140. For some embodiments, the string current command 105 is calculated and adjusted based on a command 107 from the operator center 130 (also referred to as an output from the operator controller/center) that is dependent upon the real-time balancing requirement of the grid. The string current command 105 may be transmitted via a communication medium, such as a power line carrier, a wireless medium, and/or a wired signal. In addition, an advantage of the string current command 105 is that it requires a low bandwidth requirement and thus results in a low-cost implementation. Note that controller 140 may communicate with each of the string member components 115a-c (as shown in FIG. 2) via a grid synchronization signal (i.e., the heart beat signal that corresponds to, but is not limited to, $V_{grid}$ and $I_{grid}$).

According to some embodiments, a circuit for a smart PV inverter system 100 includes one or more strings 110 coupled to an electrical load 170, where each of the one or more strings 110 further includes one or more string members 112 that are coupled to each other in series. The string members 112 include, but are not limited to, a voltage source 120 (e.g., a PV panel or battery) and a PV inverter 115. Further, the circuit for the smart PV inverter system 100 also includes a controller 140 (or a termination box) that receives an output 107 from an operator center/controller 130 and then controls the one or more strings 110, where the controller 140 is configured to control the one or more strings 110 by providing a function command 105 (or PF command) to a first string member 115a of each of the one or more strings 110 based on the output 107 from the operator controller 107.

According to one or more embodiments, the smart PV inverter system 100 can be a solar photovoltaic energy collection and conversion system. For example, the string 110 can include a plurality of SMs where each of the voltage sources 120 can be a PV panel. In such an embodiment, referred to as AC-stacking, energy from each PV panel can be independently maximized and the controller 140 and/or load center 130 can enable interfacing and synchronizing functions of the string to the grid 170. For other grid interactive or loading applications, such as battery cells or ultracapacitor-based energy storage systems that require optimization of multiple energy or generation sources, a similar architecture can address and optimize the individual battery cells or ultracapacitors for their charge and discharge profiles while servicing a required power demand Note that the smart PV inverter system 100 as shown in FIG. 1 can include one or more additional components which will be described in further detail below in FIGS. 2-4.

FIG. 2 is a detailed circuit of a smart PV inverter system 200 that includes one or more distributed AC-stacked inverters 250a-c. The smart PV inverter system 200 as shown in FIG. 2 is similar to system 100 of FIG. 1. For one embodiment, smart PV inverter system 200 includes, CAVC 201, voltage mode molecules (VMMs) 202a-b, controller 140, operator center 130, and grid 170.

In addition, smart PV invert system 200 has one or more AC-stacked PV inverters 250a-c that operate cooperatively to maintain the grid connection requirements, while providing a maximum power control on each member. As shown in FIG. 2, the smart PV inverter system 200 has three inverters 250a-c stringed together, but may include any desired number of inverters (#N of inverters). Note that, unlike other general control schemes for similar architectures (e.g., cascade h-bridge), there is no communication link between inverters 250a-c in smart PV inverter system 200, as such the control architecture of system 200 is completely distributed. For example, each inverter 250a-c may be controlled autonomously by measuring local voltages and currents.

Further, as shown in FIG. 2, smart PV inverter system 200 includes a distributed grid-tied PV inverter circuit. In this distributed grid-tied PV inverter circuit, one of the inverters 250a is assigned to regulate the string output current.

Similar to FIG. 1, the CAVC 201 and VMMs 202a-b are each string members. However, as shown in FIG. 2, only one string member of the string is referred to as the CAVC.

Likewise, the remaining (n−1) inverters operate as VMMs 202a-b. For some embodiments, VMMs 202a-b may control their own DC voltage and also generate the required output AC voltage to maintain the Maximum Power Point (MPP) of their respective PV panels. In other words, CAVC 201 not only controls its own input DC voltage to generate the MPP of its respective PV panel but also controls the string current that is common to all of the AC-stacked PV inverters 250a-c, while each VMM 202a-b controls its own input voltage needed to generate the MPP of its respective PV panels.

For one embodiment, CAVC 201 and VMMs 202a-b are each coupled in series. For most embodiments, each of the SMs (e.g., CAVC 201 and VMMs 202a-b) includes a PV inverter 250, a LC filter 260, and a CAVC distributed controller 210 or a VMM distributed controller 215. For most embodiments, the CAVC and VMM modes may be assigned to any member of the string and the same member may be assigned different modes at different run times. For some embodiments, the LC filter 260 may have one or more filtering circuit configurations (e.g., an LC filter circuit, a LCL filter circuit, etc.) depending on the grid requirements.

For example, each of CAVC 201 and VMMs 202a-b may be configured to receive the DC voltage that is generated by the respective voltage source 120a-c and then convert the DC voltage into AC voltage. Note that CAVC distributed controller 210 and VMM distributed controller 215 are similar, but the CAVC distributed controller 201 includes a reference and a measured string current (as shown in detail in FIGS. 3-4).

Figure 3A:
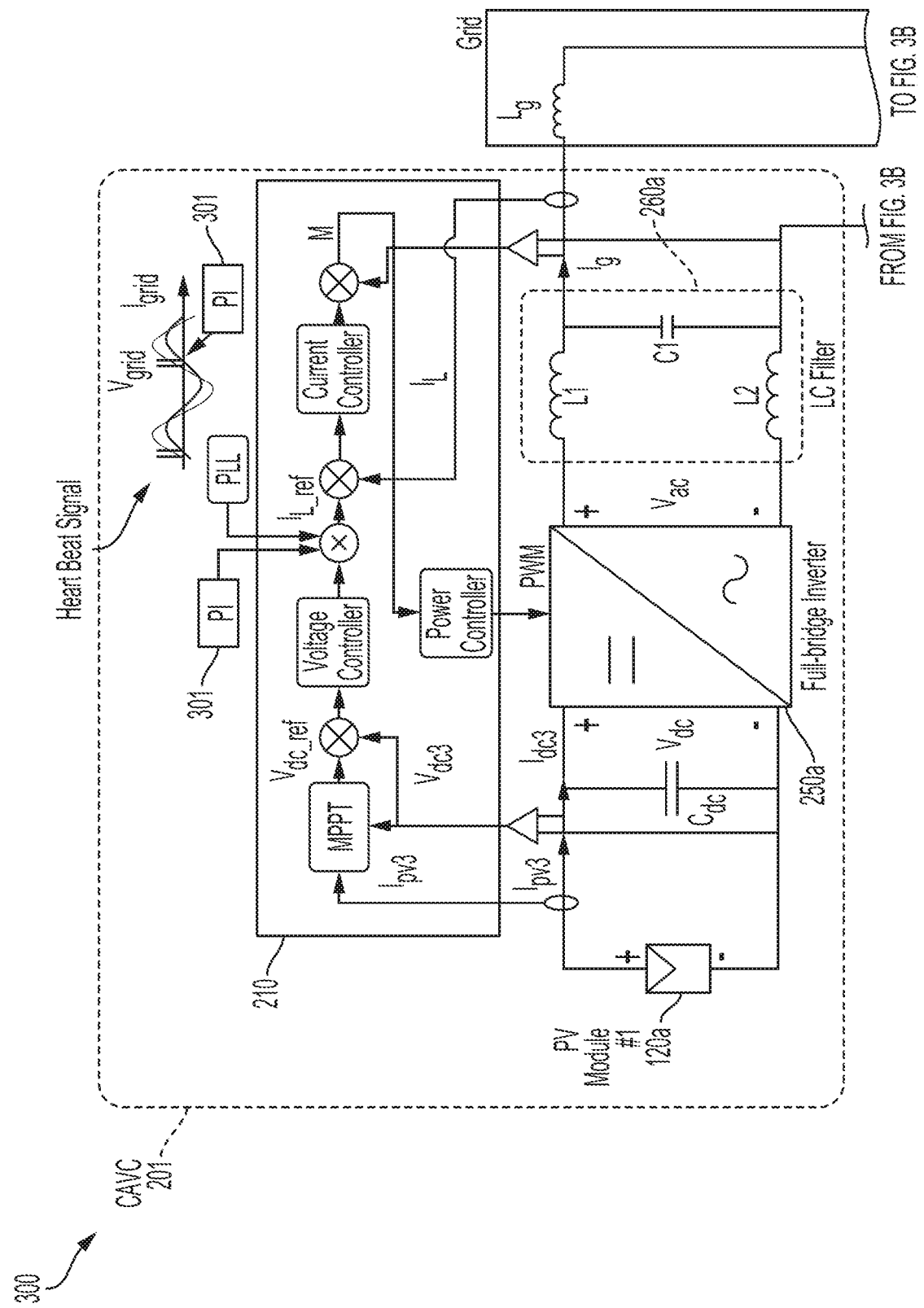
FIG. 3 is a detailed circuit of a smart PV inverter system that includes a current administrator voltage compensator (CAVC), two voltage mode members (VMMs), and an electrical grid, according to one embodiment.
Figure 3B:
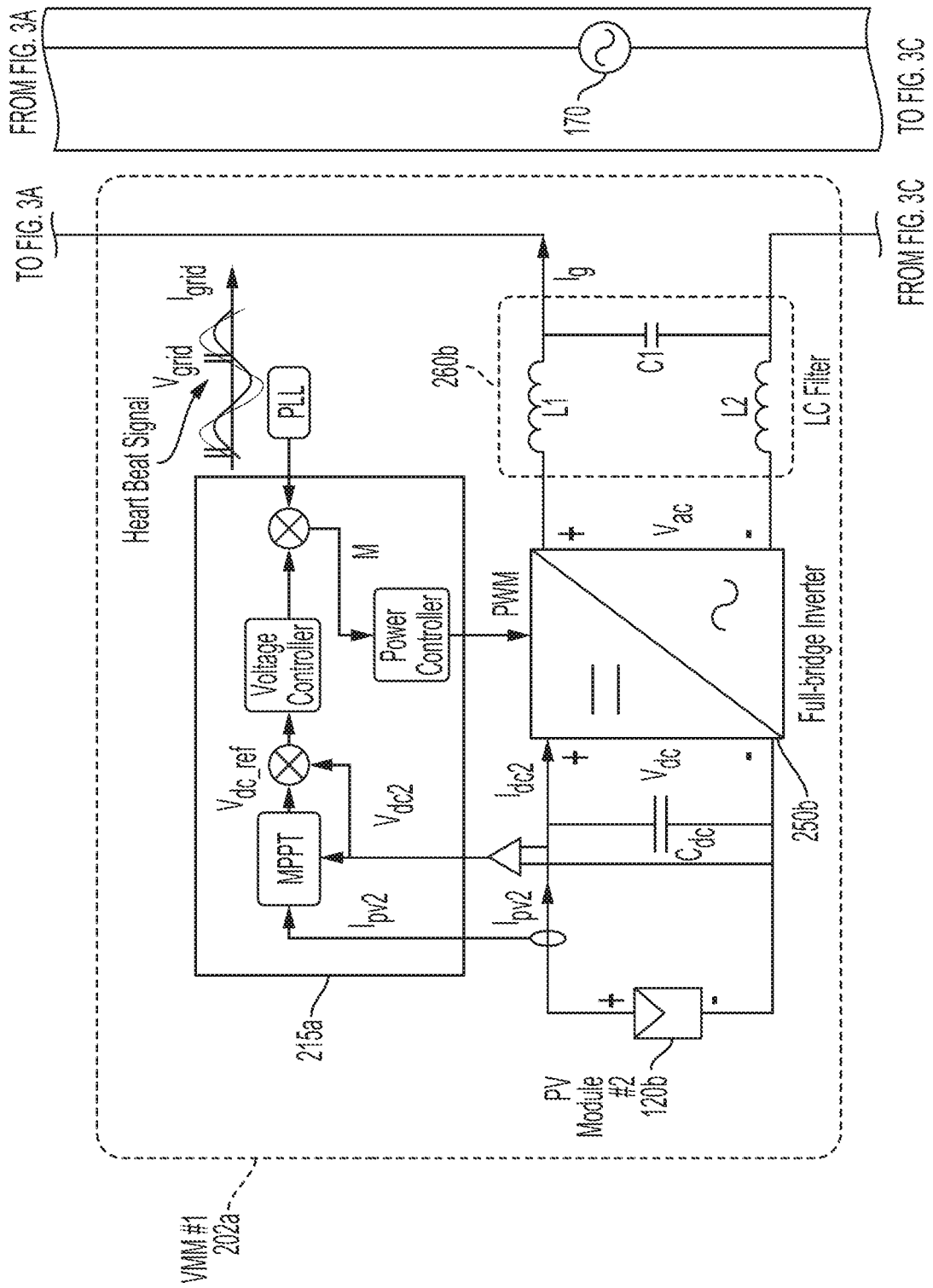
Figure 3C:
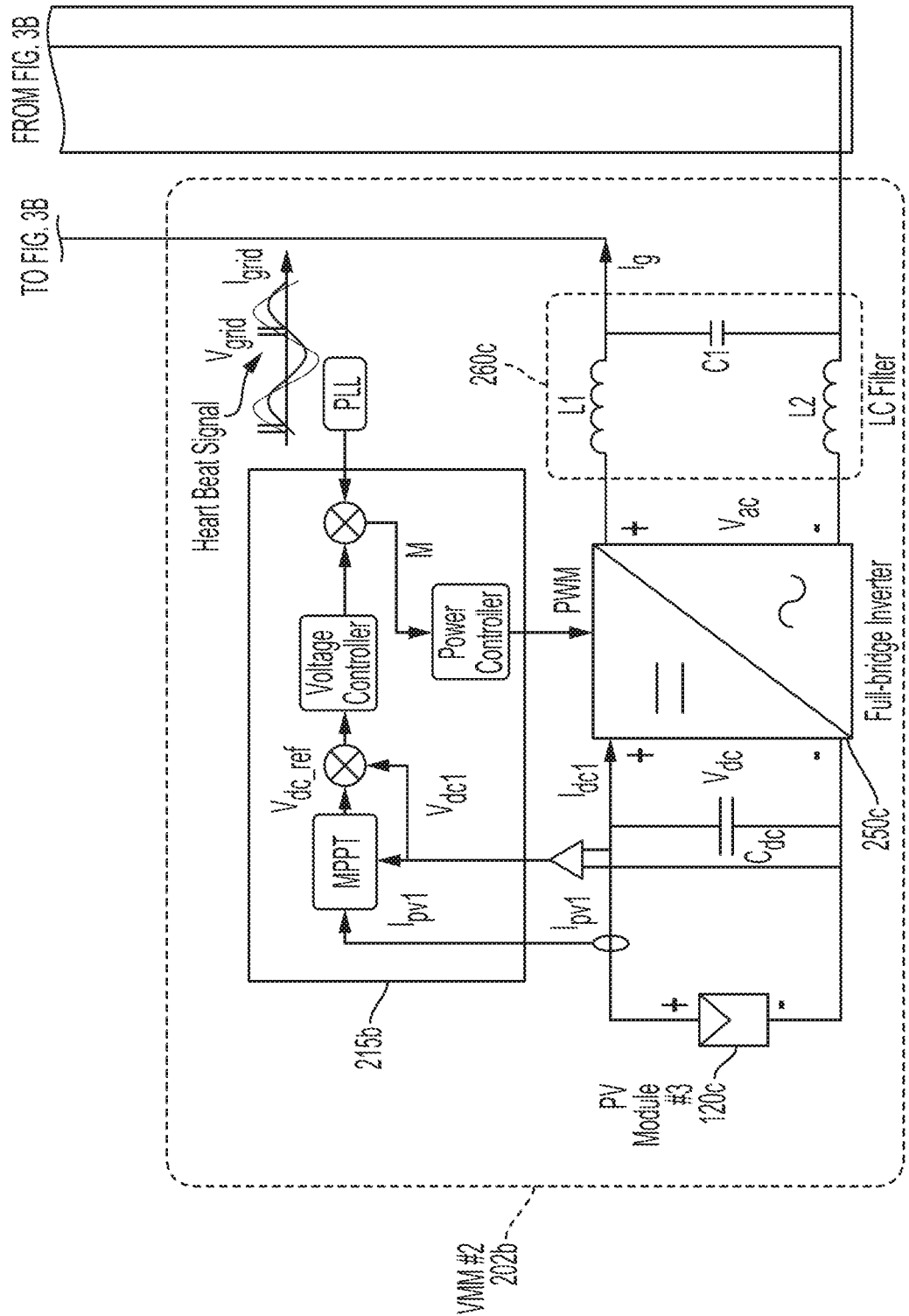

In addition, FIG. 2 illustrates that controller 140 may communicate with each of CAVC 201 and VMMs 202a-b via a grid synchronization signal 280 (or the heart beat signal as shown in FIG. 3). The grid synchronization signal 280 may be transmitted via a low-bandwidth communication medium, such as a power-line carrier (utilizing the same power wire or a different wire) a wireless medium, and/or a wired signal.

FIG. 3 is a detailed circuit of a smart PV inverter system 300 that includes a CAVC 201, VMMs 202a-b, and an electrical grid 170. The smart PV inverter system 300 as shown in FIG. 3 is similar to systems 100 and 200 of FIGS. 1-2. As shown in FIG. 3, smart PV inverter system 300 is a more detailed circuit of system 200 of FIG. 2. In particular, FIG. 3 illustrates a CAVC distributed controller 210 and a VMM distributed controller 215. Further, as shown in FIG. 3, the CAVC distributed controller 210 includes a comparator that compares the difference between a reference string current ($I_{L\_ref}$) and a measured string current ($I_L$), which is also shown in detail in FIG. 4.

For one embodiment, CAVC 201 and VMMs 202a-b are each coupled in series and coupled with grid 170. For some embodiments, CAVC 201 includes a PV inverter 250a, a LC filter 260a, and a CAVC distributed controller 210. Likewise, VMMs 202a-b include PV inverters 250b-c, LC filters 260b-c, and VMM distributed controllers 215a-b. In addition, the LC filters 260 include a LCL filter circuit, but may also include other filtering configurations depending on the grid requirements.

In addition, as shown in FIG. 3, the smart PV inverter system 300 has three inverters 250a-c connected in series, but only inverter 250a is receiving PF information 301 ("PI"), which includes the grid's phase adjustments. As such, system 300 enables "smart" inverter functionalities—without requiring a high bandwidth, a high total cost, or an extensive communications systems. Moreover, system 300 thereby implements "smart" inverter functionalities in a distributed manner without any primary reliance on communications among the inverters 250a-c.

Figure 4:
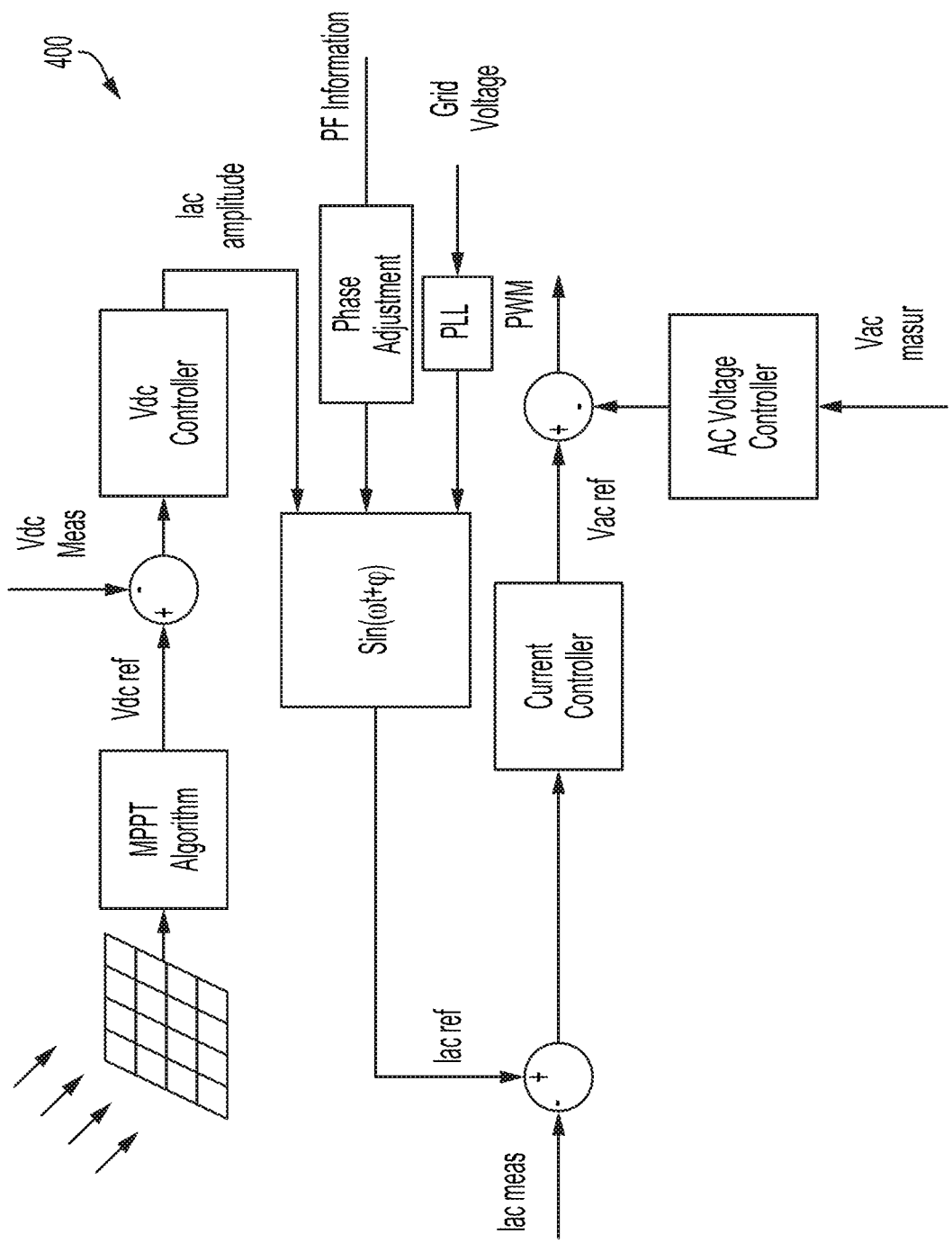
FIG. 4 is a block diagram illustrating a detailed distributed controller of a CAVC, according to one embodiment.

FIG. 4 is a block diagram illustrating a detailed CAVC distributed controller 400. CAVC distributed controller 400 is similar to the CAVC distributed controller of FIG. 3.

For some embodiments, the CAVC distributed controller 400 is designed for the input DC voltage of the inverter to be controlled by a proportional-integral (PI) controller as shown in FIGS. 3-4. The PI controller provides reference for the output current amplitude. Meanwhile, the phase of the output current is set based on PF requirement of the grid network or other external load requirements.

For one embodiment, the reference for the output current amplitude is multiplied into a sine signal which is synchronized by the grid voltage through a phase-locked loop (PLL) and builds the current reference. Then, as shown in FIGS. 3-4, the reference current is compared to the string current measurement. Further, after applying a PI controller (or PR controller), the modulation index for generating switching signals is then calculated as shown in FIGS. 3-4

As illustrated in FIG. 4, due to the variable nature of the input resource (e.g., PV, battery, or other similar voltage sources), the DC voltage input to the CAVC distributed controller 400 is controlled by the PI controller (or other similar implementations that allow effective closed-loop operation based on the error of the DC input voltage as defined by the difference between the commanded/desired DC input voltage and the actual voltage). Note that the command for the DC input voltage may be a proxy for the input power flow into the particular PV inverter (or molecule).

In addition, as shown in FIG. 4, the output of controller 400 generates a reference for the string current, as the amplitude of the current waveform. The phase of the output string current is set based on a PF requirement of the grid network and is utilized to generate the instantaneous current reference waveform. Moreover, the current reference is then synchronized to the grid voltage and closely follows the grid frequency variations. For some embodiments, as illustrated in FIG. 4, a PI controller (or proportional-resonant or other similar controller) is represented as a current controller block that synthesizes the reference voltage based upon the generated reference current and the measured string current. Also, as shown in FIG. 4, the reference voltage may be modified by a feedforward component of the measured AC voltage to generate the modulation index for regulating the inverter.

Typically, for the power factor correction alone, the transmitted signal to the CAVC controller may only constitute the phase information (or phase adjustments). However, for reactive power compensation or VAR injection, the transmitted signal to the CAVC controller may include both phase and amplitude information. For one embodiment, the necessary information (phase information, amplitude information, or both) is translated to a phase value that is transmitted to the CAVC (e.g., CAVC 201 of FIG. 3), while the other VMMs (e.g., VMMs 202a-b of FIG. 3) autonomously generate their maximum power to the string in lockstep with the string current being adjusted by the CAVC.

For one embodiment, the following Table 1 provides the string phase angle configurations of smart inverter system 300 compared to two other general configurations.

TABLE 1 illustrates a string phase angle comparison between AC-stacked PV inverter system 300 and other configurations:

| Architecture | Power | Grid Voltage Amplitude | String Current Amplitude | Power Factor | String Phase Angle (degree) |
|---|---|---|---|---|---|
| AC-stacked PV inverter architecture (Interface Inductor = 50 µH) | Lab scaled model (150 W) | Vg = 33 V | Ig = 4.5 | PF = 1 | 0.1473 |
| | | | | PF = 0.9 lag | 0.1324 |
| | | | | PF = 0.9 lead | 0.1327 |
| | Real string model (2 kW) | Vg = 120 V | Ig = 16.67 | PF = 1 | 0.15 |
| | | | | PF = 0.9 lag | 0.1349 |
| | | | | PF = 0.9 lead | 0.1352 |
| Cascaded H-bridge architecture (Interface Inductor = 1 mH) | Lab scaled model (150 W) | Vg = 33 V | Ig = 4.5 | PF = 1 | 2.9429 |
| | | | | PF = 0.9 lag | 2.5910 |
| | | | | PF = 0.9 lead | 2.7097 |
| | Real string model (2 kW) | Vg = 120 V | Ig = 16.67 | PF = 1 | 2.9979 |
| | | | | PF = 0.9 lag | 2.6384 |
| | | | | PF = 0.9 lead | 2.7615 |
| Multi-string PV inverter architecture (Interface Inductor = 3.9 mH) | Lab scaled model (150 W) | Vg = 33 V | Ig = 4.5 | PF = 1 | 11.3370 |
| | | | | PF = 0.9 lag | 9.4218 |
| | | | | PF = 0.9 lead | 11.1843 |
| | Real string model (2 kW) | Vg = 120 V | Ig = 16.67 | PF = 1 | 11.5436 |
| | | | | PF = 0.9 lag | 9.5808 |
| | | | | PF = 0.9 lead | 11.4082 |

Table 1 compares string phase angle change in different PFs for Inverter systems. Table 1 clearly shows that the phase difference between string voltage and grid voltage in system 300 is negligible with minimal variation of angle with varying PF commands within commonly acceptable PF ranges.

To accommodate smart inverter functions such as voltage support, power factor correction, reactive power injection, it is essential to transmit the commands or gating signals using high bandwidth communications medium. To avoid high bandwidth communications, centrally-controlled dispersed architectures such as cascaded H-bridge are opted to run at very low switching frequencies of 5-20 kHz (as shown in Table 1). Low switching frequency operation of the inverters in turn causes the passive components such as the AC inductors required for filtering to be in the range of a tens to hundreds of mHs depending on the switching frequency.

Meanwhile, the smart PV inverter systems described herein allows the full utilization of high frequency power semiconductors, such as low voltage MOSFETs. As a result, there are significant opportunities in shrinking the size of passive components. Small low pass filter components and interface inductors have a unique advantage not only to operate like conventional PV inverters—but also to accommodate advanced functions required for future smart inverters. Since the interface inductor value is very small in the configuration of Table 1 (<50 uH), variations of voltage drop across the inductor are negligible. Therefore, the string phase angle does not change appreciably by commanding non-unity power factor (PF).

As illustrated by FIGS. 1-4, the smart PV inverter system includes one or more AC-stacked inverters, but the system's configuration shows that only one inverter (i.e., CAVC) receives the PF information/commands In addition to the circuits shown in FIGS. 1-4, the smart PV inverter system also provides ancillary service requirements (or smart grid requirements)—in particular the smart inverter robustness index (SIRI) that evaluates the robustness of the grid-tied PV inverters. Accordingly, SIRI may include four major operational characteristics as described in detail below. These smart grid requirements allow the circuit of the smart inverter system to be customizable.

Inverter availability is one of the most important concerns for design and operation of smart PV inverter systems. Inverter availability depends on reliability and robustness of the inverter, which also impacts different performance parameters, such as efficiency. Conversion Efficiency (CE) of the PV inverter topology is typically the only parameter which is analyzed for robustness evaluation. However, there are other equally important performance criteria that are considered and analyzed for a comprehensive evaluation of the smart inverter system as described herein. The other performance criteria are: (1) Total Harmonic Distortion (THD), (2) Maximum Power Point Tracking (MPPT) effectiveness, and (3) Power Factor (PF) compliance. Along with conversion efficiency, these four indicators play an important role in assessing the overall robust operation of smart PV inverter systems due to their impact on the power quality of the grid. In particular, the PV inverters of the smart PV inverter system may require substantial inherent robustness of the architecture despite variation of components, control parameters, resident offsets to maintain all aspects of performance criteria as required of other competing single point or non-distributed inverters.

In addition, the physical variation in switches, control circuits, sensors, and active and passive components due to the manufacturing process, environmental conditions, and components aging—directly impacts the output of the system. Analog circuits are also affected by temperature related DC offsets that may result in substantial inaccuracies marginalizing the inverter functionality for smart inverter operation. Due to its distributed implementation, the smart PV inverter system is particularly susceptible to the variability of individual members or molecules which may render the string ineffective for smart inverter performance or normal operation. Accordingly, it is of substantial importance to predict the robustness of the string based on the quantitative assessment of its inverters and also to improve the string operation robustness by modifying individual inverter parameters such a current controller gains, voltage controller gains and feedforward and feedback gains. Note that this robustness evaluation (e.g., SIRI), as described herein, can be used as a self-healing factor by a smart PV inverter system (e.g., smart PV inverter systems 100, 200, and 300 of FIGS. 1-3) to improve the string operation (e.g., string 110 of FIG. 1) by changing individual inverter parameters and controller gains.

This robustness prediction/index (SIRI) allows for a more reliable prediction of the smart PV inverter system's output—and its performance map for varying operating conditions. For example, based on the robustness study that may be performed in the controller 140 of FIG. 1 (or at the backend control center), the system's firmware may further improve robustness of the string by the adjustment of individual inverters' control parameters. One such example may be to update the look-up table of control parameters of individual inverters based on the robustness assessment of the entire string.

In the smart PV inverter system, robust operation of the entire system can be affected by a physical variation of individual members, such as PV modules or inverters. These inherent inaccuracies not only impact the normal operation of system, but also make the system more vulnerable to external variations such as grid voltage fluctuations. For example, smart inverter functionalities (such as LVRT, frequency regulation and reactive power support) are also affected by these physical manufacturing variations.

For the smart PV inverter system, all the string members are controlled autonomously using local measurements, which provide the capability of correcting inaccuracies locally, but in a global (string-level perspective) by adjusting individual control gains. In order to execute this functionality, each individual inverter of the smart inverter system needs to have a qualitative evaluation of its performance robustness.

Another important factor to the evaluation is robustness determination. The outputs of power electronic circuits rely on the performance of electrical components, such as switches, sensors, inductors, capacitors and etc. Variation of physical components has a critical impact on reliability of power electronic modules. Since physical variation is a consequence of the inherent randomness in power electronic devices, statistical analysis methods such as Monte Carlo Solving big statistical problems with several uncertain variables by using Monte Carlo analysis requires large number of sampling points. In order to reduce the number of required sampling points for Monte Carlo analysis, variance reduction techniques may be utilized. Importance sampling, control varieties and stratified sampling are some of the more popular variance reduction methods. A commonly used method known as The Latin Hypercube Sampling (LHS) method is a type of stratified Monte Carlo sampling algorithms, which is an effective method for reducing required number of sampling points. The LHS method not only reduces the required number of sampling points but also improves the accuracy and confidence in the results. As described herein, each physical variable is modeled with lognormal distribution function. For example, Random Latin Hypercube Sampling (RLHS) algorithm may be used to select a sample size of 50 points. Note that this is an example of robustness analysis based on the SIRI index to show the boundary of robustness for the smart PV inverter systems (e.g., smart PV inverter systems 100, 200, and 300 of FIGS. 1-3); however the number of sampling point can be different (i.e., not a sampling size of 50 points) based on the probability distribution function of variable parameters. For some embodiments, robust operation of inverter system was analyzed utilizing this reduced sampling set. This was repeated for components with different standard deviations until the robustness boundary was found.

The evaluation assessments as described herein, therefore thus relies upon SIRI which quantifies the robustness operation of the smart PV inverter system, as described herein. Conversion Efficiency, THD, MPPT effectiveness, and PF compliance are the four (4) main operational characteristics of grid connected PV inverters that should be considered in the robustness evaluation of PV inverters.

For some embodiments, SIRI utilizing these parameters of Equation 1, as used for the unity power factor condition, is presented below. In addition, for other embodiments, SIRI may utilize Equation 2 also presented below, as a generalized application. As such, both Equation 1 and Equation 2 of SIRI are presented below:

$$SIRI = \begin{cases} \frac{(PF - k_{pf})}{(1 - k_{pf})} \times \frac{(\text{Efficiency} - k_{Eff})}{(1 - k_{Eff})} \times \\ \frac{\left(\frac{(1 - THD) -}{(1 - k_{THD})}\right)}{k_{THD}} \times \frac{(MPPT_{Effectiveness}) - (k_{MPPT})}{(1 - k_{MPPT})}, & PF > k_{pf}, Eff > k_{Eff}, THD > k_{THD} \text{ or } MPPT_{Effectiveness} > k_{MPPT} \\ -1, & PF < k_{pf} \text{ or } Eff < k_{Eff} \text{ or } THD < k_{THD} \text{ or } MPPT_{Effectiveness} > k_{MPPT} \end{cases} \quad (1)$$

$$SIRI = \begin{cases} \frac{(|PF - k_{pf}|)}{(|PF_{ref} - k_{pf}|)} \times \frac{(\text{Efficiency} - k_{Eff})}{(1 - k_{Eff})} \times \\ \frac{\left(\frac{(1 - THD) -}{(1 - k_{THD})}\right)}{k_{THD}} \times \frac{(MPPT_{Effectiveness}) - (k_{MPPT})}{(1 - k_{MPPT})}, & PF > k_{pf}, Eff > k_{Eff}, THD > k_{THD} \text{ or } MPPT_{Effectiveness} > k_{MPPT} \\ -1, & PF < k_{pf} \text{ or } Eff < k_{Eff} \text{ or } THD < k_{THD} \text{ or } MPPT_{Effectiveness} > k_{MPPT} \end{cases} \quad (2)$$

Simulation are the best tools for solving these problems. For example, the Monte Carlo simulation method uses statistical analysis and random sampling experiment that provides approximate solutions for problems which are random in nature. As such, Monte Carlo method may be applied for reliability and robustness analysis of the system by varying the electronic/control components and major power electronic circuit parameters.

Where:
$k_{pf}$ is the minimum acceptable Power Factor compliance accuracy
$k_{Eff}$ is the minimum acceptable Conversion Efficiency
$k_{THD}$ is the maximum acceptable THD
$k_{MPPT}$ is the minimum acceptable MPPT effectiveness For conversion efficiency, MPPT effectiveness, and PF compliance, a minimum acceptable value is selected which can be defined based on application and standards. For the THD term, the maximum acceptable value is defined based on IEEE standard 519-1992, which is 5%. The minimum acceptable conversion efficiency for this architecture may be 98%. It is worth noting that the minimum acceptable conversion efficiency limit can be different based on application. The limit for power factor compliance and MPPT effectiveness may be defined as relatively 99%.

When all four terms in the SIRI index Equation 1 are positive, the inverter is in robust region. On the other hand, when one of the robustness evaluation terms is negative, the inverter operates outside of the robustness region and the SIRI is −1. In order to develop a relative index that can comparatively evaluate the operation of the inverters in the robust region, each term is appropriately normalized as shown in Equation 1 above. In the robust region of operation, the higher the SIRI index the more robust the PV inverter operation. While the index determines the comparative performance of the molecules in the string, the index may also be used for comparing the performance of different inverter architectures.

Figure 5A:
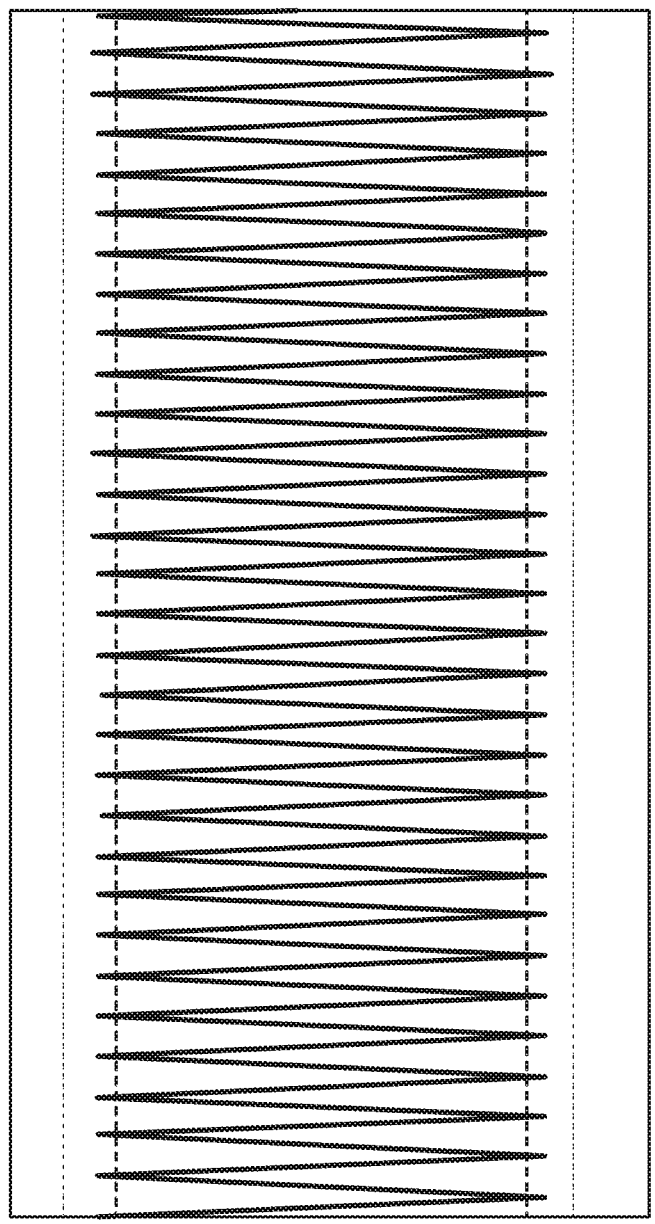
FIGS. 5A-C are graphs illustrating one or more reactive power control operations of a PV inverter string.
Figure 5B:
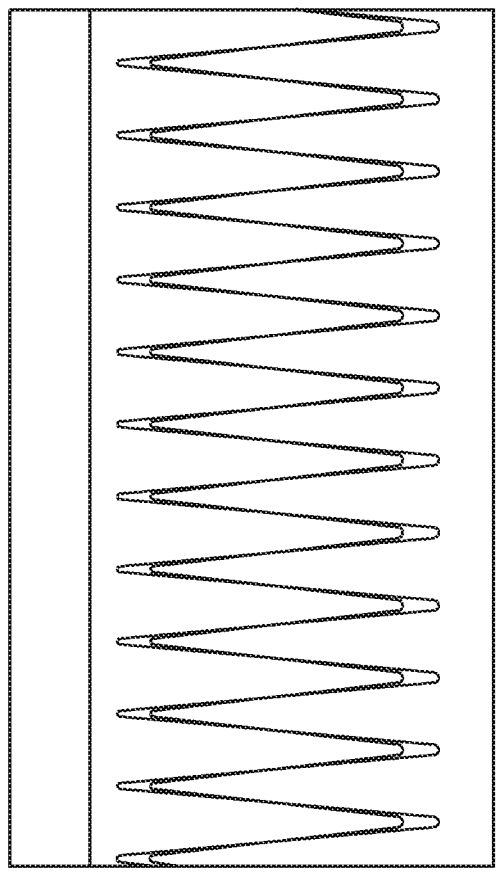
Figure 5C:
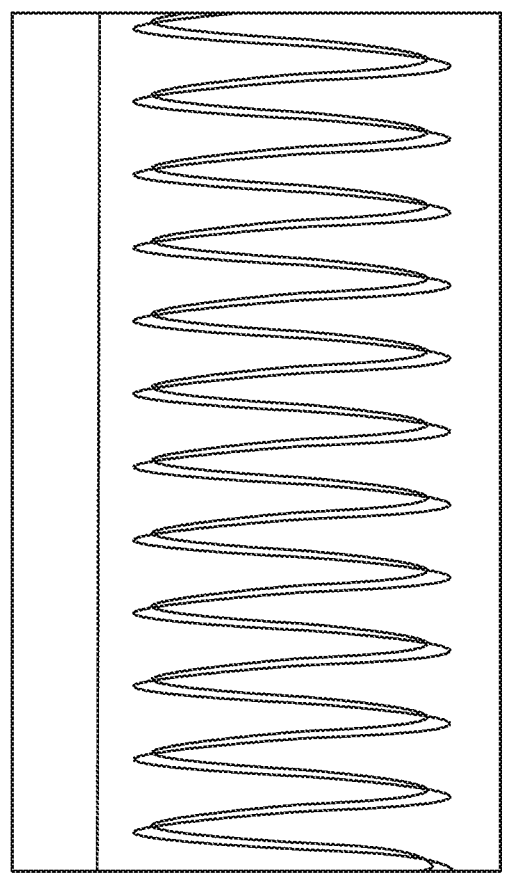

FIGS. 5A-C are graphs illustrating one or more reactive power control operations of a PV inverter string. FIG. 5A is a graph illustrating an AC voltage transient of a PV inverter string. FIG. 5B is a graph illustrating a direct current (DC) voltage control of a maximum power point tracking (MPPT) operation before a power factor (PF) change of a PV inverter string. FIG. 5C is a graph illustrating a DC voltage control of a MPPT operation after a PF change of a PV inverter string.

For one embodiment, the small interface inductor allows PF command updates made only to CAVC (e.g., CAVC 201 of FIG. 3), which regulates the output current. As such, graph 500 shows the voltage transient due to the change in PF. Graph 500 shows the CAVC output voltage, the VMM #1 output voltage, the grid voltage, and the current into the grid. Note that in graph 500 the PF is changed from 1 to 0.9 lead. Also note that to maintain the MPP, the CAVC increases the current amplitude.

In addition, graphs 510 and 520 show the DC voltages of CAVC and VMM #1. Scope measurements in these graphs show that average DC voltages remain constant after change in PF command which illustrates individual inverters are able to maintain MPPT operation before and after PF alteration. Further, graphs 510 and 520 show that the string delivers maximum power to the grid in both conditions (before and after PF alteration).

Figure 6:
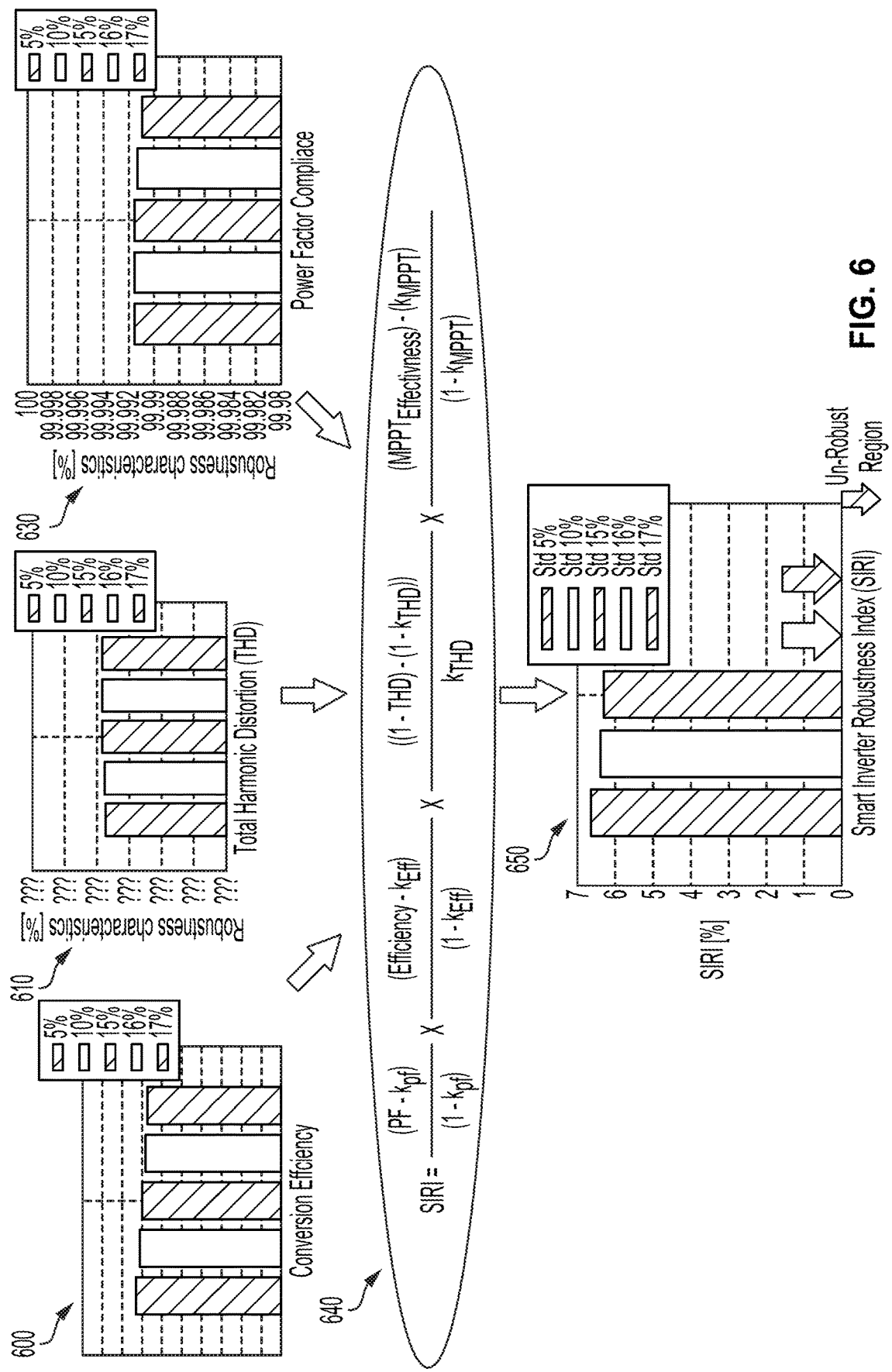
FIG. 6 illustrates an equation and graphs that show one or more parameters of a smart inverter robustness process, according to one embodiment.

FIG. 6 illustrates a SIRI equation 640 and graphs 600, 610, 630, and 650 that show one or more parameters (e.g., CE, THD, PF compliance. etc.) of a smart inverter system. In addition, FIG. 6 shows the average of different robustness characteristics (e.g., CE, THD, PF compliance. etc.) as applied to the SIRI equation 640 (which similar to Equation 1 as described above). As shown in FIG. 6, conversion efficiency and PF compliance are reduced by increasing standard deviation. On the other hand, higher standard deviations of manufacturing inaccuracies lead to lower THD because higher standard deviation leads to higher passive component values which reduce the harmonic distortion.

The average value of all three robustness characteristics are in robust region. But in 16% and 17% standard deviation, there are specific sampling results in which conversion efficiency is lower than 98%, which is the minimum acceptable CE for this example. Accordingly, as shown in FIG. 6, the system is not robust and SIRI index is −1 for 16% and 17% standard deviations. Note that lower standard deviation leads to higher SIRI which means a PV inverter system with tighter manufacturing tolerances is more robust than a system with higher manufacturing inaccuracies. The maximum tolerable standard deviation in this system is 15%. For higher than 15%, the system does not operate in robust region and the SIRI is −1.

Figure 7:
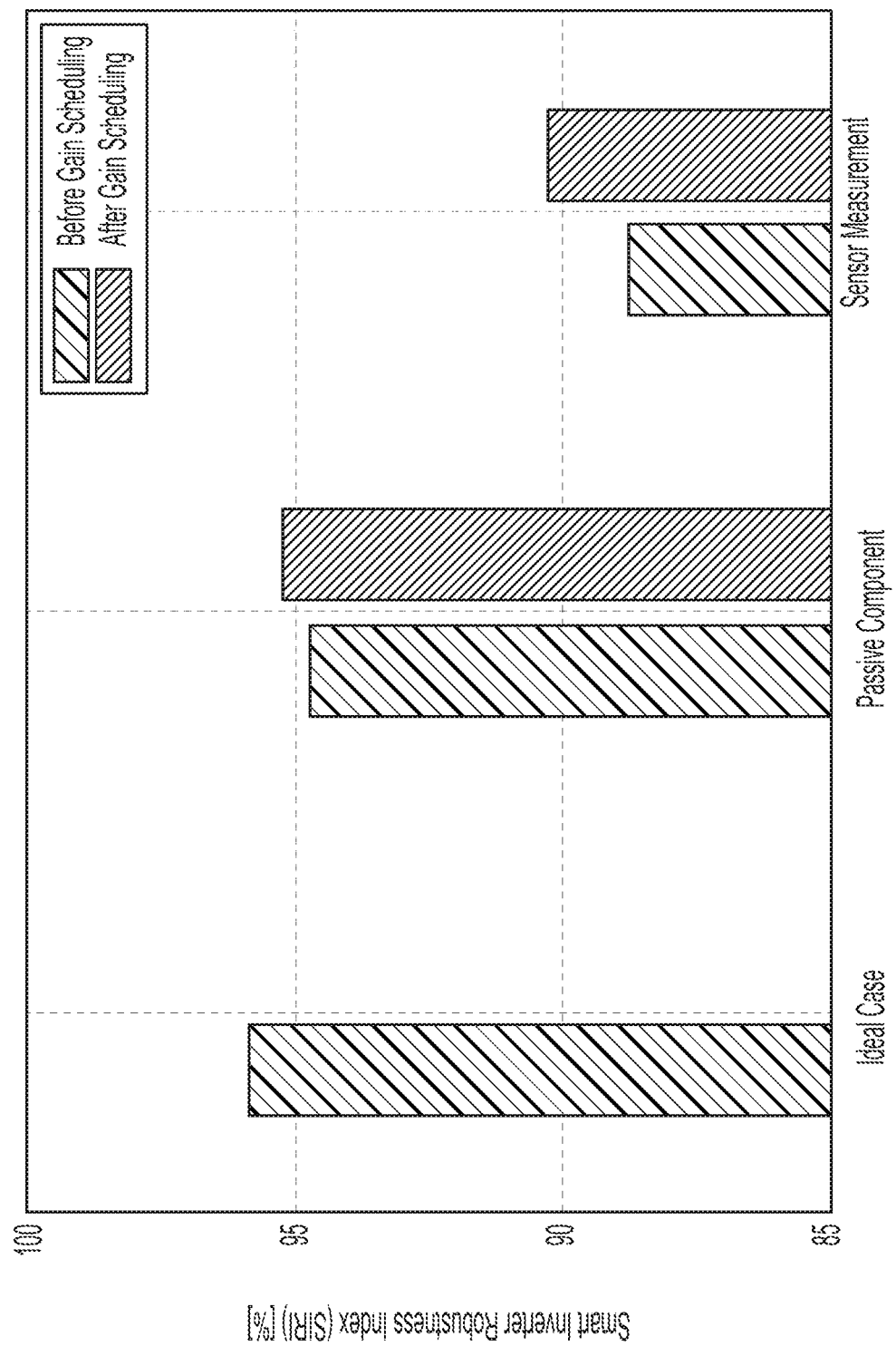
FIG. 7 is a graph illustrating a smart inverter robustness index (SIRI) before gain scheduling and after gain scheduling, according to one embodiment.

FIG. 7 is a graph 700 illustrating a smart inverter robustness index (SIRI) before gain scheduling and after gain scheduling. For example, FIG. 7 presents the flowchart of a gain scheduling method based on smart inverter robustness analysis that may improve the robust operation of the PV inverter system.

Another smart inverter robustness analysis is the impact of specific component inaccuracy on the robustness of the whole PV system and modifying the robustness using controller gains as shown in graph 700. For example, graph 700 may include measurements based on system 300 of FIG. 3, where the system is a grid tied PV inverter system that includes three inverters. For example, using local control gain scheduling as shown in FIG. 7, the system robustness is improved in both active and passive component variation conditions.

Figure 8:
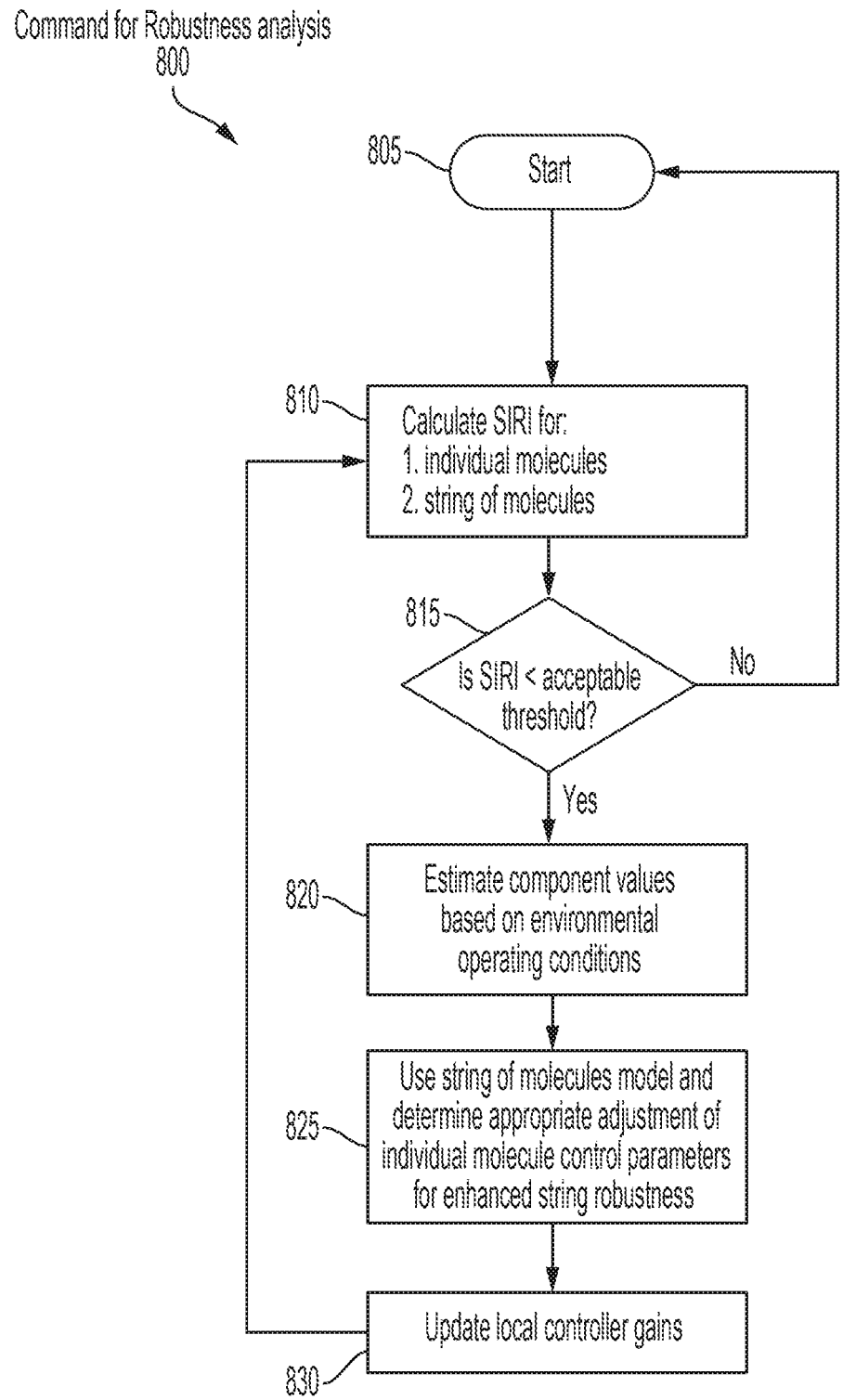
FIG. 8 is a process flow illustrating a method of a smart PV inverter for a command of a robustness analysis, according to one embodiment.

FIG. 8 is a process flow 800 illustrating a method of a smart PV inverter for a command of a robustness analysis. For one embodiment, process flow 800 may be implemented in a smart PV inverter circuit as shown in FIGS. 1-3.

At block 805, process flow starts the command for robustness analysis. At block 810, process flow calculates SIRI for (i) individual molecules (or inverters), and/or (ii) a string of molecules. For example, process flow 800 may calculate SIRI of PV inverters 250 as shown in FIG. 2. Then, at block 815, processing logic determines whether SIRI is less than the acceptable threshold (as set by the grid requirements). If SIRI is not less than the acceptable threshold, then process flow returns back to block 805 where the process flow can restart. If SIRI is less than the acceptable threshold, then process flow proceeds to block 820.

At block 820, process flow estimates component values based on environmental operating conditions. At block 825, process flow uses the stringed inverter circuit (as shown in FIGS. 1-3) and determines appropriate adjustment of individual inverter control parameters to enhanced string robustness. Accordingly, process flow updates the local controller gains at block 830. In addition, at block 830, after updating the local controller gains, process flow proceeds back to block 810, where process flow 800 may repeat itself indefinitely (or any other time/step limit). For example, the local controller gains can be updated on controller 140 of FIG. 1 when it is determined that appropriate adjustment of individual inverter control parameters is needed. Also note that in respect to the SIRI utilization/process 800, the following are some essential functions: (i) SIRI is likely calculated, but not limited to, at the string level (i.e., SIRI may be calculated at the molecule level and then synthesized based on individual models); (ii) if SIRI is determined outside of a pre-determined range (as determined in block 815), control parameters of individual molecules/members are adjusted based on preset parameters (or algorithms) of the smart PV inverter system that brings the string SIRI within an acceptable range (note that this range may be set or adjusted based on the respective string and/or grid requirements); and (iii) the SIRI process (e.g., SIRI process 800) may be repeated indefinitely (note that this timeframe may be set or adjusted based on the respective string and/or grid requirements).

Figure 9:
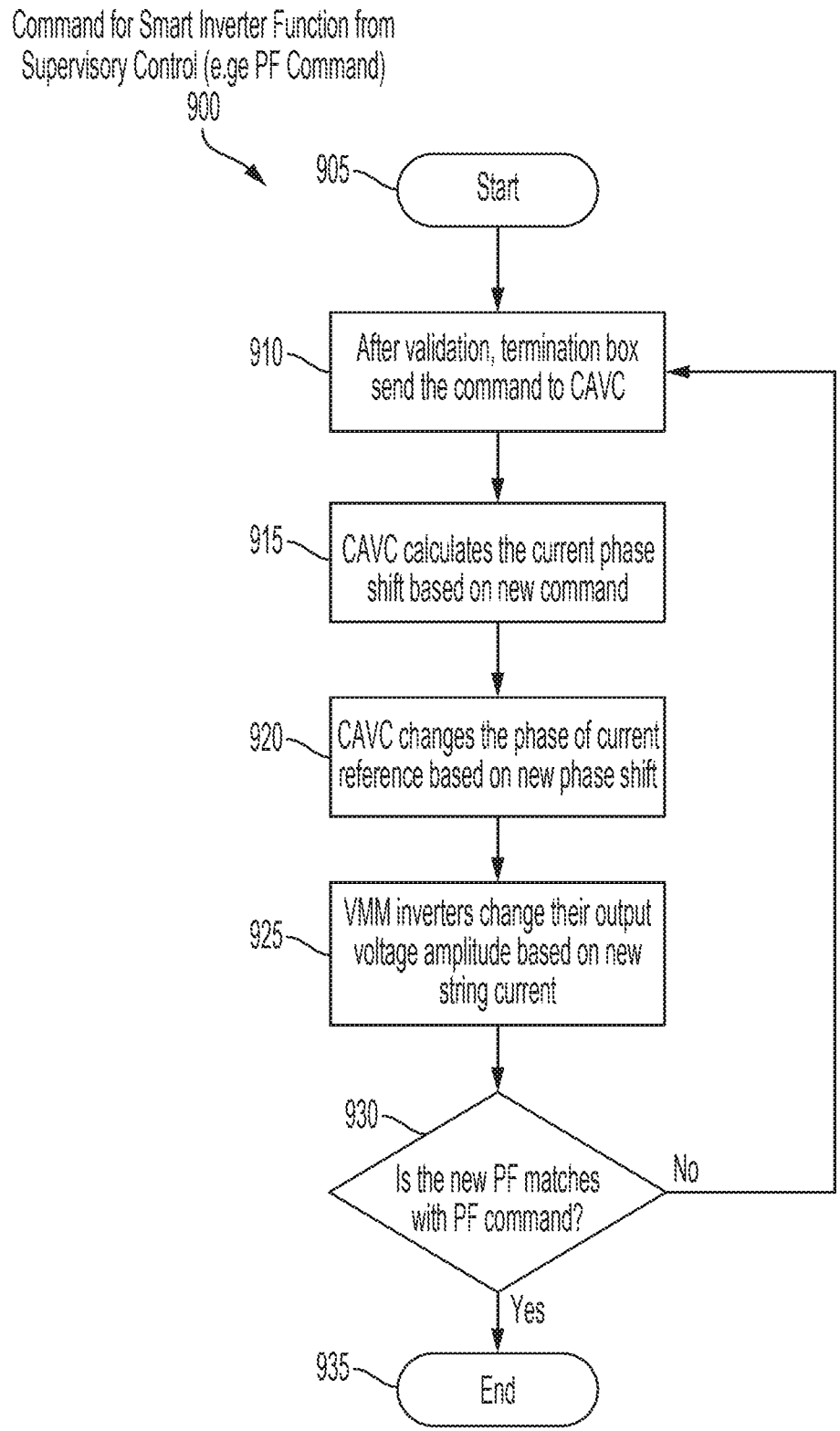
FIG. 9 is a process flow illustrating a method of a smart PV inverter for a command function (e.g., PF command) of an operator center, according to one embodiment.

FIG. 9 is a process flow 900 illustrating a method of a smart PV inverter for a command function (e.g., PF command) of an operator center (e.g., operator center 130). Process flow 900 may be implemented in a smart PV inverter circuit as shown in FIGS. 1-3.

At block 905, process flow starts the PF command from a supervisory interface (e.g., operator center 130). At block 910, after validation, process flow sends the command to the CAVC from a termination box (e.g., controller 140 of FIG. 1). At block 915, process flow calculates the current phase shift based on the new command at the CAVC. At block 920, process flow changes the phase of the current reference, at the CAVC, based on the new phase shift. At block 925, process flow transmits the new string current, as such the VMM inverters change their output voltage amplitude based on the new string current. At block 930, processing logic determines whether the new PF matches the PF command. If the new PF does not match the PF command, process flow returns back to block 910 to revalidate. However, if the PF match, process flow proceeds to block 935 to end the process.

Accordingly, additional advantages of the embodiments as shown in FIGS. 1-9 are: reduced panel level inverter module size and weight; improved panel level inverter module conversion efficiency, which reduces losses and heat generation; reduced panel level inverter module output harmonics and THD—harmonics magnitudes are reduced and medium frequency harmonics are nearly eliminated; and advanced grid integration functionalities due to integrated low impact panel level inverter.

Figure 10:
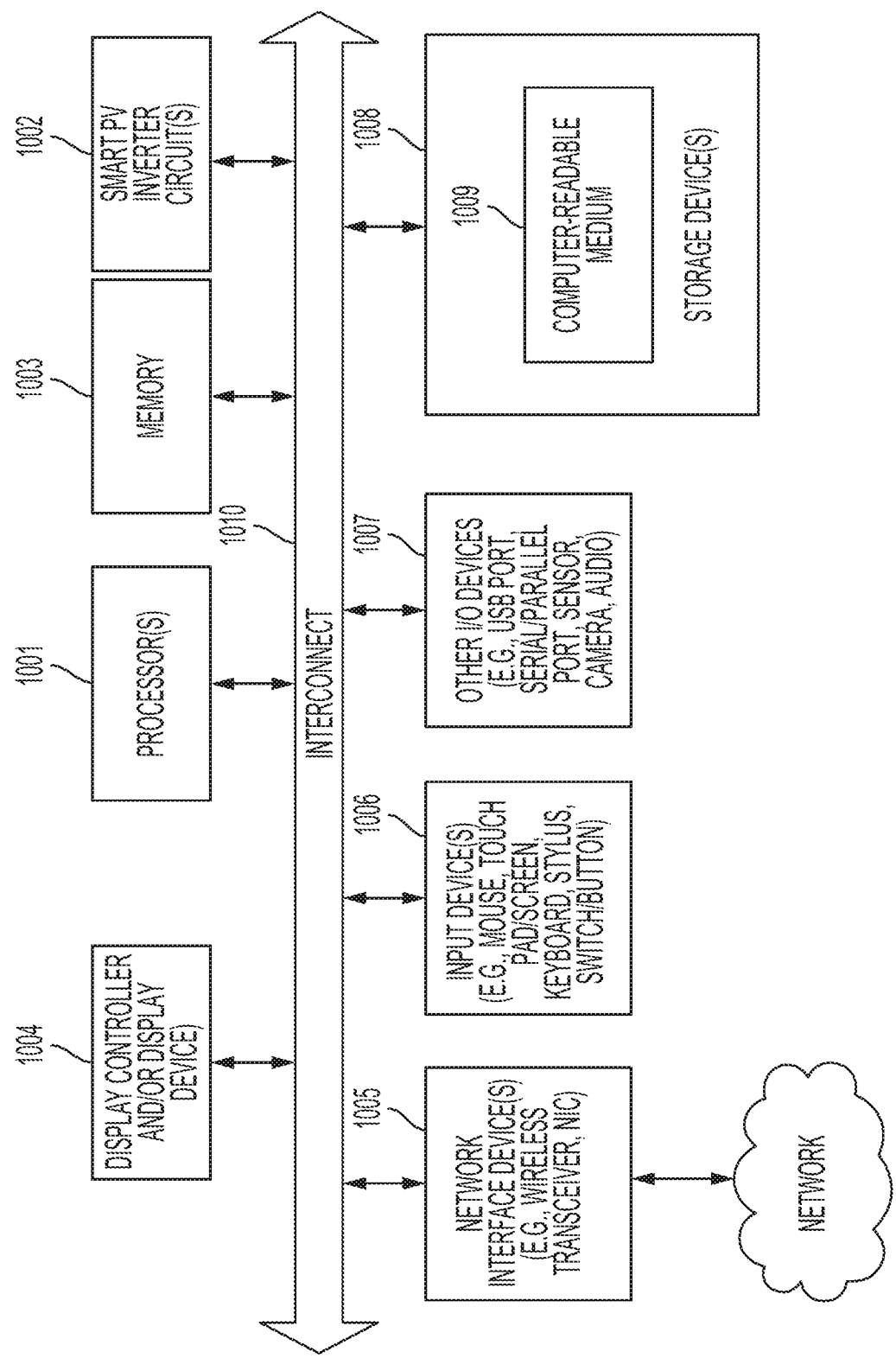
FIG. 10 is a block diagram illustrating a data processing system that utilizes a PV inverter circuit, according to one embodiment.

FIG. 10 is a block diagram illustrating an example of a data processing system 1000 that includes smart PV inverter circuits 1002, as described herein. For example, system 1000 may represent a data processing system for performing any of the processes or methods described above in connection with any of FIGS. 1-9. System 1000 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1000 is intended to show a high-level view of many components of the computer system. However, it is to be understood that additional components may be present in certain implementations and furthermore, different arrangement of the components shown may occur in other implementations. System 1000 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1000 includes processor 1001, smart PV inverter circuit(s) 1002, memory 1003, and devices 1005-1008 via a bus or an interconnect 1010. Processor 1001 may represent a single processor or multiple processors with a single processor core or multiple processor cores included therein. Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1001, which may be a low power multi-core processor socket such as an ultra-low voltage processor, may act as a main processing unit and central hub for communication with the various components of the system. Such processor can be implemented as a system on chip (SoC). Processor 1001 is configured to execute instructions for performing the operations and/or steps discussed herein. System 1000 may further include a graphics interface that communicates with optional graphics subsystem 1004, which may include a display controller, a graphics processor, and/or a display device.

Processor 1001 may communicate with smart PV inverter circuits 1002 and memory 1003, which in one embodiment can be implemented via multiple memory devices to provide for a given amount of system memory that incorporates "smart" functionalities of an advanced grid integration of distributed AC-stacked inverters (e.g., PV inverters 250a-c of FIG. 2). Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001 or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1000 may further include I/O devices such as devices 1005-1008, including network interface device(s) 1005, optional input device(s) 1006, and other optional IO device(s) 1007. Network interface device 1005 may include a wireless transceiver and/or a network interface card (NIC). The wireless transceiver may be a WiFi transceiver, an infrared transceiver, a Bluetooth transceiver, a WiMax transceiver, a wireless panel assembly telephony transceiver, a satellite transceiver (e.g., a global positioning system (GPS) transceiver), or other radio frequency (RF) transceivers, or a combination thereof. The NIC may be an Ethernet card.

Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, input device 1006 may include a touch screen controller coupled to a touch screen. The touch screen and touch screen controller can, for example, detect contact and movement or a break thereof using any of multiple touch sensitivity technologies, including but not limited to capacitive, resistive, infrared, and surface acoustic wave technologies, as well as other proximity sensor arrays or other elements for determining one or more points of contact with the touch screen.

I/O devices 1007 may include an audio device. An audio device may include a speaker and/or a microphone to facilitate voice-enabled functions, such as voice recognition, voice replication, digital recording, and/or telephony functions. Other IO devices 1007 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1007 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1010 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, a mass storage (not shown) may also couple to processor 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor 1001, e.g., via a serial peripheral interface (SPI). This flash device may provide for non-volatile storage of system software, including a basic input/output software (BIOS) as well as other firmware of the system.

Storage device 1008 may include computer-accessible storage medium 1009 (also known as a machine-readable storage medium or a computer-readable medium) on which is stored one or more sets of instructions or software embodying any one or more of the methodologies or functions described herein. Embodiments described herein (e.g., the process flows 800 and 900 described above in connection with FIGS. 8-9) may also reside, completely or at least partially, within memory 1003, and/or within processor 1001 during execution thereof by data processing system 1000, memory 1003, and processor 1001 also constituting machine-accessible storage media. Modules, units, or logic configured to implement the embodiments described herein (e.g., the process flows 800 and 900 described above in connection with FIGS. 8-9) may further be transmitted or received over a network via network interface device 1005.

Computer-readable storage medium 1009 may also be used to store some software functionalities described above persistently. While computer-readable storage medium 1009 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the embodiments described herein. The term "computer-readable storage medium" shall accordingly be taken to include, but not be limited to, solid-state memories, and optical and magnetic media, or any other non-transitory machine-readable medium.

Components and other features described herein can be implemented as discrete hardware components or integrated in the functionality of hardware components such as ASICS, FPGAs, DSPs, or similar devices. In addition, any of the components described above in connection with any one of FIGS. 1-9 can be implemented as firmware or functional circuitry within hardware devices. Further, these components can be implemented in any combination hardware devices and software components.

Note that while system 1000 is illustrated with various components of a data processing system, it is not intended to represent any particular architecture or manner of interconnecting the components; as such, details are not germane to embodiments described herein. It will also be appreciated that network computers, handheld computers, mobile phones, servers, and/or other data processing systems, which have fewer components or perhaps more components, may also be used with embodiments described herein.

In the foregoing specification, embodiments have been described with reference to specific exemplary embodiments thereof. It will be evident that various modifications may be made thereto without departing from the broader spirit and scope. The specification and drawings are, accordingly, to be regarded in an illustrative sense rather than a restrictive sense.

What is claimed is:

1. A circuit for a smart photovoltaic (PV) inverter system, wherein the PV inverter system comprises a node of a distributed grid network, the circuit comprising:
   one or more strings coupled to an electrical load, each of the one or more strings comprising one or more string members coupled to each other in series, wherein each of the one or more string members comprises a voltage source and an inverter; and
   a controller to receive an output from an operator controller and control the one or more strings, wherein the controller is configured to control the one or more strings by providing a function command to a first string member of each of the one or more strings based on the output from the operator controller, wherein the output is based, at least in part, on a balancing requirement associated with a disturbance in a load of the distributed grid network; the first string member of each string calculates a current phase shift based on the function command; the first string member of each string adjusts a string current of each string based on the calculated current phase shift; and the one or more remaining string members of each string autonomously modifies an output voltage amplitude of the respective string member based on the adjusted string current.

2. The circuit of claim 1, wherein the voltage source receives an output from an energy output device.

3. The circuit of claim 2, wherein the inverter is configured to convert the output of the energy output device into an energy source of the electrical load.

4. The circuit of claim 1, wherein the electrical load further comprises a grid interface to couple the energy collection system to an electrical grid.

5. The circuit of claim 1, wherein the controller is configured to determine a smart inverter robustness index of each string based on one or more inverter parameters.

6. The circuit of claim 5, wherein the one or more inverter parameters include a conversion efficiency, a total harmonic distortion parameter, a maximum power point tracking effectiveness parameter, and a power factor compliance parameter.

7. The circuit of claim 1, where each of the string members further comprises a distributed controller and a LC filter.

8. The circuit of claim 2, wherein the energy output device includes a PV panel or other energy collection or generation device.

9. The circuit of claim 4, wherein the first string member further comprises a current comparator.

10. A smart PV inverter system, comprising:
an operator center;
an electrical load;
one or more strings coupled to the electrical load, each of the one or more strings comprising one or more string members coupled to each other in series, wherein each of the one or more string members comprises a voltage source and an inverter; and
a controller to receive an output from the operator center and to control the one or more strings, wherein the controller is configured to control the one or more strings by providing a function command to a first string member of each of the one or more strings based on the output from the operator center, wherein the output is based, at least in part, on a balancing requirement associated with a disturbance in the electrical load; the first string member of each string calculates a current phase shift based on the function command; the first string member of each string adjusts a string current of each string based on the calculated current phase shift; and the one or more remaining string members of each string autonomously modifies an output voltage amplitude of the respective string member based on the adjusted string current.

11. The smart PV inverter system of claim 10, wherein the voltage source receives an output from an energy output device.

12. The smart PV inverter system of claim 11, wherein the inverter is configured to convert the output of the energy output device into an energy source of the electrical load.

13. The smart PV inverter system of claim 10, wherein the electrical load further comprises a grid interface to couple the energy collection system to an electrical grid.

14. The smart PV inverter system of claim 10, wherein the controller is configured to determine a smart inverter robustness index of each string based on one or more inverter parameters.

15. The smart PV inverter system of claim 14, wherein the one or more inverter parameters include a conversion efficiency, a total harmonic distortion parameter, a maximum power point tracking effectiveness parameter, and a power factor compliance parameter.

16. The smart PV inverter system of claim 10, where each of the string members further comprises a distributed controller and a LC filter.

17. The smart PV inverter system of claim 11, wherein the energy output device includes a PV panel or other energy collection or generation device.

18. The smart PV inverter system of claim 10, wherein the first string member further comprises a current comparator.

* * * * *